United States Patent
Vegt et al.

(10) Patent No.: US 9,783,106 B2
(45) Date of Patent: Oct. 10, 2017

(54) METHOD AND CONTROL UNIT FOR COMMUNICATION BETWEEN AN AUTONOMOUS VEHICLE AND A ROAD USER

(71) Applicant: Bayerische Motoren Werke Aktiengesellschaft, Munich (DE)

(72) Inventors: Emar Vegt, Munich (DE); Lenja Sorokin, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 15/177,839

(22) Filed: Jun. 9, 2016

(65) Prior Publication Data

US 2016/0362045 A1    Dec. 15, 2016

(30) Foreign Application Priority Data

Jun. 12, 2015  (DE) .................. 10 2015 210 781

(51) Int. Cl.
*B60Q 1/00* (2006.01)
*B60Q 5/00* (2006.01)
(Continued)

(52) U.S. Cl.
CPC .............. *B60Q 5/006* (2013.01); *B60Q 5/005* (2013.01); *B60R 21/0134* (2013.01); *H04L 67/12* (2013.01); *H04W 4/00* (2013.01)

(58) Field of Classification Search
CPC ...... B60Q 5/006; B60R 21/0134; H04L 67/12
(Continued)

(56) References Cited

U.S. PATENT DOCUMENTS

| | | | |
|---|---|---|---|
| 6,166,656 A * | 12/2000 | Okada ................... | B60N 2/002 340/573.1 |
| 2005/0073438 A1 * | 4/2005 | Rodgers ................ | G08G 1/166 340/944 |

(Continued)

FOREIGN PATENT DOCUMENTS

| DE | 10 2009 057 683 A1 | 6/2011 |
|---|---|---|
| DE | 10 2011 013 647 A1 | 1/2012 |

(Continued)

OTHER PUBLICATIONS

German Search Report issued in German Patent Application No. 10 2015 210 781.7 dated Feb. 23, 2016 with partial English translation (13 pages).

*Primary Examiner* — Daryl Pope
(74) *Attorney, Agent, or Firm* — Crowell and Moring LLP

(57) ABSTRACT

A control unit for a vehicle is set up to receive environment data from one or more ambient sensors of the vehicle. The control unit is additionally set up to take the environment data as a basis for detecting at least one road user in an environment of the vehicle, and to take the environment data and a driving strategy as a basis for determining whether there is a need for communication between road user and vehicle and what content needs to be communicated in what way. The control unit is set up, when it has been determined that there is a need for communication between road user and vehicle, to prompt one or more acoustic communication devices of the vehicle to generate an acoustic output in order to communicate with the road user.

12 Claims, 1 Drawing Sheet

(51) Int. Cl.
*B60R 21/0134* (2006.01)
*H04L 29/08* (2006.01)
*H04W 4/00* (2009.01)

(58) Field of Classification Search
USPC .......................... 340/906, 907, 916; 701/300
See application file for complete search history.

(56) References Cited

U.S. PATENT DOCUMENTS

| | | | |
|---|---|---|---|
| 2007/0257783 A1* | 11/2007 | Matsumoto | B60K 6/445 |
| | | | 340/425.5 |
| 2012/0095646 A1* | 4/2012 | Ghazarian | G01S 19/17 |
| | | | 701/36 |
| 2016/0229397 A1* | 8/2016 | Muthukumar | B60R 21/013 |

FOREIGN PATENT DOCUMENTS

| | | |
|---|---|---|
| DE | 10 2013 021 271 A1 | 7/2014 |
| DE | 10 2013 004 834 A1 | 9/2014 |
| DE | 10 2013 216 490 A1 | 2/2015 |

\* cited by examiner

METHOD AND CONTROL UNIT FOR COMMUNICATION BETWEEN AN AUTONOMOUS VEHICLE AND A ROAD USER

CROSS REFERENCE TO RELATED APPLICATIONS

This application claims priority under 35 U.S.C. §119 from German Patent Application No. 10 2015 210 781.7, filed Jun. 12, 2015, the entire disclosure of which is herein expressly incorporated by reference.

BACKGROUND AND SUMMARY OF THE INVENTION

The invention relates to a method and a corresponding apparatus that allow a computer-controlled and/or autonomous vehicle to communicate with its environment, particularly with human beings in its environment.

At present, various initiatives on the subject of "Intelligent Transportation Systems" (ITS) at the European standardization authorities ETSI and CEN, and also at ISO in the USA, among others, involve the standardization of SAE and IEEE communication protocols and cooperative security applications that are intended to allow cooperative and, where possible, accident-free driving across vehicle manufacturers in the future. Cooperative security applications also include collision avoidance applications and collision mitigation applications, among others, for side and rear end collisions. The security applications addressed, and also the associated transmission protocols and data formats, are documented in ETSI standard TS 102 637 and in SAE standard SAEJ2735. Thus, the TS 102 637-2 standard defined what is known as a Cooperative Awareness Message (CAM) that is sent at periodic intervals by an ITS station (e.g. by a vehicle) in order to inform other ITS stations (e.g. other vehicles) in the surroundings about selected information (e.g. speed, acceleration and/or position) from the sending ITS station. The information interchanged between the ITS stations, e.g. on the basis of CAM messages, can be used in the respective ITS stations to identify collision risks and, if need be, to initiate suitable countermeasures (e.g. warnings).

The communications methods within the context of ITS are aimed at communication between different ITS stations (i.e. different machines and different electronic equipment). Direct communication between machine and human being is not taken into consideration in this case. In particular, no communication between computer-controlled/autonomous vehicles and human beings in the surroundings of the vehicle is taken into consideration and rendered possible. Such communication can be used to increase the safety and acceptance of computer-controlled/autonomous vehicles in road traffic, however.

It is an object of the present invention to allow direct communication between a vehicle (e.g. an automobile, a truck or a motorcycle) and its surroundings, particularly with a human being in its surroundings.

This and other objects are achieved in accordance with embodiments of the invention.

According to one aspect, a control unit for a vehicle is described. The vehicle can be a single-track or dual-track road vehicle, particularly an automobile or a truck. The vehicle may be set up to move in road traffic without the intervention of a driver. In other words, it may be a computer-controlled vehicle and/or an autonomous vehicle.

The control unit is set up to receive environment data from one or ore ambient sensors of the vehicle. The environment data can include information concerning surroundings or an environment of the vehicle. The one or more ambient sensors can be a camera, a laser, an ultrasonic sensor and/or a radar sensor. Furthermore, the control unit may be set up to receive position data from a positioning unit (e.g. from a navigation system) of the vehicle. The position data can be used to position the vehicle relative to a road arrangement and/or relative to other road users.

The control unit is additionally set up to take the environment data (and if need be to take the position data) as a basis for detecting at least one road user in an environment of the vehicle. In particular, a human road user can be detected. The control unit may also be set up to detect a multiplicity of different road users at different positions in the environment of the vehicle at the same time.

Furthermore, the control unit is set up to take the environment data as a basis for determining whether there is a need for communication between road user and vehicle. There may be a need for communication particularly when, in a present traffic situation, communication can avoid or resolve a potential future or already existent hazard situation, a potential future or already existent misunderstanding and/or a potential future or already existent deadlock. Similarly, there may be a need for communication in situations in which communication generates trust or acceptance in the (highly) automated vehicle and/or promotes safety or fluid traffic.

In particular, the environment data can be taken as a basis for determining that the road user is in the process of ascertaining whether be has been detected by the vehicle. In other words, it is possible to identify that the detected road user seeks contact with the vehicle (e.g. with a driver of the vehicle) in order to ensure that be has been noticed by the vehicle (or by the driver of the vehicle). Such a situation exists e.g. in the case of a pedestrian wishing to use a zebra crossing who, before crossing the road, glances at the approaching vehicle in order to ensure that the vehicle has noticed (i.e. detected) him.

In order to determine whether there is a need for communication between road user and vehicle, the control unit may be set up to take the surroundings data (e.g. to take image data) as a basis for detecting eyes of a human road user. Furthermore, the control unit may be set up to take the detected eyes as a basis for determining that there is a need for communication between road user and vehicle. In particular, the detected eyes of the road user can be taken as basis for determining that the road user is in the process of ascertaining whether be has been detected by the vehicle. By way of example, a glance from the road user in the direction of a windshield of the vehicle may be an indicator that the road user is in the process of checking whether be has been detected by the vehicle.

The control unit is additionally set up to prompt one or more acoustic communication devices of the vehicle to generate an acoustic output if it has been determined that there is a need for communication between road user and vehicle, particularly if it has been determined that the road user is in the process of ascertaining whether be has been detected by the vehicle. The acoustic output can include human voice; abstract, nonhuman voice; and/or a transient sound event. In particular, the acoustic output can include a combination of transient and nontransient sound events. In this case, the nontransient sound events may be abstract and/or nonabstract. Furthermore, the transient sound events can include hum voice and/or a combination of abstract and/or nonabstract sound elements that act as nonhuman voice.

The acoustic output may be aimed particularly at indicating to the road user that be has been detected by the vehicle and/or in what function (concerning the traffic situation) the road user has been detected by the vehicle. Furthermore, the acoustic output may be aimed at indicating to the road user what intention the vehicle has in relation to a traffic situation (in particular a possible hazard situation or a situation in which the flow of traffic could be impaired).

The control unit described ensures that road users, in particular human road users, are identified by the vehicle, even without intervention by a driver of the vehicle, and are informed by the vehicle about the fact that they have been identified. By implication, this also means that the road user is provided with clarity in this regard in the case in which he has not been identified by the vehicle. The certainty about noticing and being noticed in road traffic typically results in an increase in safety in road traffic. Hence, the control unit can help to increase the safety of (possibly autonomous vehicles in road traffic, particularly in relation to human road users.

As already set out above, the control unit may be set up to ascertain a position of the road user (or positions of a multiplicity of road users). In addition, the control unit may be set up to generate a locally pinpointed acoustic output in the direction of the position of the road user. For this purpose, the one or more acoustic communication devices can include an acoustic group emitter having a multiplicity of individual emitters. The control unit may be set up to prompt the acoustic group emitter to generate the locally pinpointed acoustic output. The transmission of locally pinpointed acoustic outputs for one or more different road users can increase the unambiguity for the communication between the vehicle and the one or more road users. This in turn results in increased safety for autonomously driving vehicles.

The control unit may be set up to ascertain one or more properties in relation to the need for communication between road user and vehicle. The one or more properties in relation to the need for communication can indicate e.g. the urgency of a communication between road user and vehicle (between low and high urgency). Alternatively, or additionally, one or more properties in relation to the need for communication can indicate the content and/or the intention of the communication between road user and vehicle (e.g. a warning about a hazard situation, a piece of information about the intention/planned driving strategy of the vehicle, a request to the road user, etc.).

The control unit may be set up to generate or adjust the acoustic output on the basis of the one or more properties in relation to the need for communication. In particular, a parameter of an output sound can be adjusted. By way of example, an output sound can be adjusted in order to underline the urgency of the communication between vehicle and road user. By adjusting the acoustic output, it is possible to increase the quality of the communication between vehicle and road user further, resulting in increased safety for the autonomously driving vehicle.

The control unit may be set up take the need for communication as a basis for selecting a sound for the acoustic output from a multiplicity of predefined sounds, for generating a sound for the acoustic output by means of a sound algorithm from a multiplicity of predefined sound algorithms and/or for modulating a sound for the acoustic output. The provision of a multiplicity of predefined sounds and/or sound algorithms and also the provision of modulation options can allow precise communication by use of acoustic signals, which in turn increases safety for the autonomous vehicle.

The control unit may be set up to ascertain ambient noise in the environment of the vehicle. In particular, a frequency spectrum and/or a volume level for the ambient noise can be ascertained. The acoustic output can then be generated on the basis of the ambient noise. In particular, the acoustic output can be generated such that the acoustic output can still be noticed by the road user despite the ambient noise. This ensures reliable communication.

As set out above, the control unit may be set up to take the environment data as a basis for determining that there is a need for communication between the vehicle and a multiplicity of road users. Furthermore, the control unit may be set up to prompt the one or more acoustic communication devices of the vehicle to generate a multiplicity of acoustic outputs for communication with the corresponding multiplicity of road users. In particular, multiplicity of locally pinpointed, directional, acoustic outputs can be generated for the road users. It is thus possible to achieve univocal communication with multiple road users and further increased road safety for autonomously driving vehicles.

The control unit may be set up to take the environment data and possibly to take the position data as a basis for ascertaining one or more indicators for an intention of the road user. The one or more indicators for an intention of the road user may include e.g. a direction of movement of the road user relative to the vehicle (from which e.g. it is possible to infer that the road user wishes to cross the road ahead of the vehicle), a line of vision of the road user relative to the vehicle (looking right/left indicates e.g. that the road user wishes to cross a road), a road sign and/or a traffic installation in the environment of the vehicle and the road user (a zebra crossing indicates e.g. that a road user wishes to cross the road).

On the basis of the one or more indicators, it is then possible to determine that there is a need for communication between road user and vehicle. In particular, it is possible to determine that there is a hazard situation between vehicle and road user. In this case, a hazard situation may be e.g. a possible risk of collision between vehicle and road user. The control unit may then be set up to prompt the one or more acoustic communication devices of the vehicle to generate a (possibly further) acoustic output, e.g. in order to indicate to the road user how the vehicle will behave in relation to the hazard situation and/or in order to provide an instruction or a request for the road user so that the road user can adjust his behavior and in this way a safe encounter with the vehicle is rendered possible. Hence, particularly a human road user can obtain certainty about whether or not the vehicle presents a hazard. It is therefore possible to ensure increased safety, fluid traffic and increased acceptance in road traffic even for autonomous vehicles.

The control unit may be set up to ascertain what content needs to be communicated from the vehicle to the road user and/or how the content needs to be communicated from the vehicle to the road user. It is therefore possible to ascertain a communication strategy. This can be ascertained on the basis of the environment data and possibly on the basis of the vehicle data cited further below. The acoustic output can then also be generated on the basis of the content to be communicated and/or on the basis of how the content is to be communicated.

The control unit may be set up to ascertain vehicle data in relation to a driving strategy of the vehicle, in relation to a driving destination of the vehicle, in relation to a driving mode of the vehicle, in relation to an action by the occupant of the vehicle and/or in relation to a preference of an occupant of the vehicle. It is then also possible to take the vehicle data as a basis for determining whether there is a need for communication between road user and vehicle, and if need be what content needs to be communicated to the road user in what way.

According to a further aspect, a method for communication between a vehicle and a road user is described. The method includes the ascertainment of environment data on the basis of one or more environment sensors of the vehicle. Furthermore, the method includes the detection, on the basis of the environment data, of at least one road user in an environment of the vehicle. In addition, the method includes the determination, on the basis of the environment data and the driving strategy, of whether there is a need for communication between road user and vehicle. In particular, it is possible to take the environment data as a basis for determining that the road user is in the process of ascertaining whether be has been detected by the vehicle. The method additionally includes, when it has been determined that there is a need for communication between road user and vehicle, the selection of communication content and the generation of a communication strategy and, on the basis thereof, the generation of an acoustic output by one or more acoustic communication devices of the vehicle in order to communicate with the road user, e.g. in order to indicate to the road user that be has been detected by the vehicle, and/or in what function (e.g. as a pedestrian, as a cyclist, as another vehicle) the road user has been detected by the vehicle, and/or what intention the vehicle has in relation to the traffic situation (particularly a possible hazard situation or a situation in which the fluid flow of traffic is impaired), and/or what knowledge the vehicle has about the intention of the road user in relation to the traffic situation. The knowledge of the vehicle about the intention of the road user in relation to the traffic situation can be obtained e.g. on the basis of the one or more indicators for the intention of the road user.

According to a further aspect, a vehicle (particularly a road vehicle, e.g. an automobile, a truck or a motorcycle) is described that includes the control unit.

According to a further aspect, a software (SW) program is described. The SW program can be set up to be executed on a processor (e.g. on a control unit) and in order to carry out the method described herein as a result.

According to a further aspect, a storage medium is described. The storage medium can store an SW program that is set up to be executed on a processor and to carry out the method described herein as a result.

It should be noted that the methods, apparatuses and systems described in this document can be used either on their own or in combination with other methods, apparatuses and systems described in this document. Furthermore, the aspects of the methods, apparatuses and systems described in this document can be combined with one another in many and diverse ways.

Other objects, advantages and novel features of the present invention will become apparent from the following detailed description of one or more preferred embodiments when considered in conjunction with the accompanying drawings.

DETAILED DESCRIPTION OF THE DRAWINGS

The invention relates to the direct communication between a vehicle (particularly an autonomous, self-driving) vehicle and its surroundings. This direct communication typically does not require the use of telecommunication devices for wireless or wired telecommunication.

The increasing automation of driving systems or vehicles gives rise to the problem that it is difficult for human road users to interpret the behavior of an autonomous vehicle and to assess whether the vehicle has identified them and/or what intention the vehicle is pursuing. However, the information is of significant importance for a human road user, e.g. when using a zebra crossing.

An apparatus is described that allows a vehicle to communicate particularly with human road users in order to communicate the existence of reciprocal notice (the vehicle notices the human road user and is likewise noticed by the human road user). Similarly, the apparatus described can allow communication in relation to the respectively intended behavior in road traffic.

In particular, the apparatus described may be set up:
to report back to a road user whether and as what the road user has been identified by the apparatus;
to interpret the behavior and the explicit communication of the road user and to reflect the resultant understanding of the intentions back to the road user;
to provide pointers to what action the apparatus will perform next with respect to the road user (e.g. allow the human road user across the road or allow another vehicle to merge);
to provide instructions or requests for the road user (e.g. in critical situations: "Attention!", or a request to yield: "Please yield to me");
to provide confirmations or feedback (e.g. to say thank you).

This makes it apparent the other road user how much the apparatus knows and understands. In particular, the human road user is provided with the opportunity to communicate and hence to safely interact with an automated vehicle.

Figure 1:
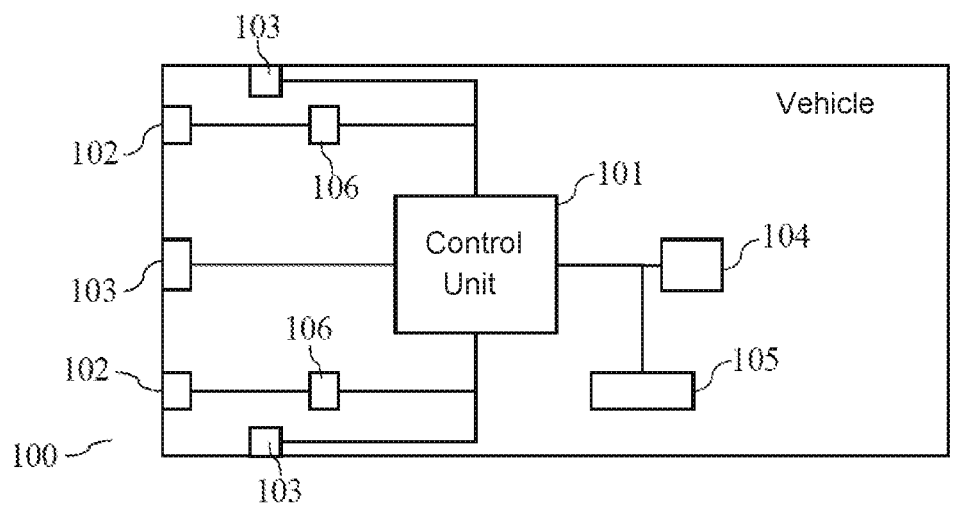
FIG. 1 is a schematic a block diagram of exemplary components of a vehicle.

FIG. 1 shows a block diagram of selected components of a vehicle 100. In particular, FIG. 1 shows a control unit 101 for a vehicle 100, the control unit 101 being set up to allow direct communication by the vehicle 100 with one or more road users in the surroundings of the vehicle 100. The direct communication may be a form of communication that can be perceived directly by a sensory organ of a human being, particularly without the need for a telecommunication device. To this end, the control unit 101 may be set up to prompt the vehicle 100 to output a message to the one or more road users in visual and/or audible form. This message can be perceived directly by the eyes and/or ears of the one or more road users.

The vehicle 100 includes one or more ambient sensors 103 that are set up to record information concerning the environment or the surroundings of the vehicle 100. The one or more ambient sensors 103 can include e.g. a camera (infrared, visible light) that can be used to record graphical information from the environment. On the basis of the graphical information, it is possible e.g. for another road user to be sensed ahead or to the side of the vehicle 100, e.g. a pedestrian or another vehicle. Alternatively or additionally, be one or more ambient sensors 103 can be a radar sensor that can be used to ascertain e.g. a distance between the vehicle 100 and another road user. The data provided by the one or more ambient sensors 103 can be referred to as environment data.

The control unit 101 is set up to receive the environment data from the one or more ambient sensors 103. Furthermore, the control unit 101 is set up to take the environment data as a basis for detecting one or more road users in the surroundings of the vehicle 100, particularly in the surroundings ahead of the vehicle 100.

Furthermore, the control unit 101 may be set up to take the environment data as a basis for ascertaining one or more indicators regarding an intention of the one or more road users. For this purpose, the control unit 101 can also use position data from a positioning unit 104 (e.g. from a navigation system) of the vehicle 100. The position data can particularly be information regarding the present position of the vehicle 100, regarding a road profile of a road on which the vehicle 100 is located, and/or regarding road signs on the road. In particular, the position data can allow the control unit 101 to position the vehicle 100 and the one or more detected road users relative to one another and relative to a road arrangement. By way of example, it is thus possible to ascertain that a detected pedestrian is on a sidewalk and standing at a zebra crossing in order to cross a road on which the vehicle 100 is currently situated. This may be an indicator that the pedestrian has the intention of crossing the road on the zebra crossing ahead of the vehicle 100.

Further examples of indicators for the intention of a road user are:
- a movement profile for the detected road user (e.g. a pedestrian) in the direction of the road on which the vehicle 100 is situated;
- a hand movement by the detected road user (e.g. a pedestrian) in the direction of the vehicle 100;
- a line of vision of the detected road user (e.g. a pedestrian) in the direction of the vehicle 100;
- the sensing of a turn signal from the detected road user (e.g. another, nonautonomous vehicle) in order to change to the lane of the vehicle 100.

On the basis of the environment data and possibly on the basis of the position data, it is thus possible to ascertain one or more indicators for the intention of the detected other road user. Furthermore, it is thus possible to ascertain (particularly on the basis of the one or more indicators) whether there is a need for communication between the vehicle 100 and the detected other road user. In particular, it is possible to ascertain whether there is a potential hazard situation (e.g. a risk of collision) between the vehicle 100 and the other road user, and whether the potential hazard situation requires a communication between the vehicle 100 and the detected road user.

The control unit 101 may additionally be set up to use a communication device 102, 106 of the vehicle 100 to communicate with the detected road user in relation to the potential hazard situation. In particular, the communication devices 102, 106 may be set up to generate acoustic signals for communication with another road user.

On the basis of different acoustic signals, it is possible e.g. to communicate:
- that the vehicle 100 drives in automated fashion or is entering an automated mode or is terminating an automated mode (and hence the driver of the vehicle 100 is taking over).
- that the vehicle 100 has noticed one or more other road users;
- what properties and/or intentions the vehicle 100 has identified for a noticed road user;
- what intentions the vehicle 100 has;
- a request to another road user to perform a particular action;
- communicating context information, e.g. the reason why the vehicle 100 is stopping;
- further messages, such as the transmission of an acknowledgement to another road user.

The acoustic communication devices 102, 106 may be set up to produce nondirectional or directional sound. It thus becomes possible for other road users to identify whether transmitted acoustic information is intended for the whole environment of the vehicle 100 (in the case of nondirectional sound) or whether transmitted acoustic information is directed only at one or more individual road users (in the case of directional sound).

The acoustic signals generated by the acoustic communication devices 102, 106 can include human voice (or a derivation thereof). Alternatively or additionally, abstract, nonhuman voice and/or sounds and/or musical fragments can be generated. The control unit 101 may be set up to access a database 105 that has a multiplicity of different acoustic signals or sounds. It is then possible for one or more acoustic signals or sounds to be selected from the database 105. A sound selected from the database 105 can be altered by a modulator 106 of the acoustic communication devices 102, 106 if need be. The one or more (possibly modulated) sounds can then be output by way of one or more acoustic emitters (e.g. loudspeakers) 102.

The pointers produced by the acoustic communication devices 102, 106 can be represented as transient sound events (also referred to as sounds). In this case, a sound event is generated only when this is necessary, i.e. when a communication contributes to safety and/or to fluent and efficient flow of traffic and/or to acceptance of the driving behavior of the vehicle 100.

Alternatively or additionally, the pointers can be manifested by changes in a continuous driving sound from the vehicle 100. In this case, tonal or other changes in a synthesized driving sound (that is either generated for the communication or already present) can communicate information about the state, about the intentions and/or about requests to other road users.

The acoustic communication devices 102, 106 may be set up to output an acoustic signal in a manner directed at one or more road users for whom a particular communication is intended. This can be achieved e.g. through the use of loudspeaker arrays or acoustic group emitters. Furthermore, nondirectional output of acoustic signals can also take place if required.

The vehicle 100 can transmit an acoustic signal matched to the respective road user and/or to the respective traffic situation, or a change in an acoustic signal, to each detected road user. The acoustic communication devices 102, 106 may therefore be set up to generate multiple acoustic signals and/or multiple changes in acoustic signals at the same time. To this end, a multiplicity of acoustic actuators (particularly loudspeakers) can be actuated individually or jointly if need be. In this case, an acoustic actuator can be actuated on the basis of the position of the road user and/or on the basis of the position of the actuator.

By way of example, the orientation of a sound or of a sound change, focused on individual road users, can be effected by virtue of an acoustic output on the basis of one or more conventional loudspeakers, a loudspeaker array, actuators that produce audible sound by means of ultrasound conversion, moving actuators, excitation of an exterior face of the vehicle 100, modulation of a sound-producing unit, such as a fan or electric motor of the vehicle 100, actuation of moving parts, actuation of sound-influencing parts, such as the valve in an exhaust system, and/or actuable surface properties. In this case, the parameters of a sound and/or of a sound change are adjusted on the basis of the respective output technique in order to achieve the desired directional effect, information transmission and/or aesthetics.

The orientation of a sound or of a sound change can also be achieved, if need be, by way of specific shaping of the sound parameters, such as alteration of the frequencies used, in order to optimize the range and directional effect of the sound or of the sound change.

The control unit 101 is set up to ascertain a road user with whom there is a need to communicate. Furthermore, the control unit 101 is set up to ascertain road-user-dependent information for the road user, such as, for example:

the position of the road user (relative to the vehicle 100);
the distance of the road user from the vehicle 100;
the speed and/or the direction of movement of the road user (relative to the vehicle 100);
the type of road user (pedestrian, cyclist, etc.);
the actual intention or path of the road user;
the desired path or behavior of the road user from the point of view of the vehicle 100;
a risk assessment in relation to a possible hazard situation with the road user;
a remaining period of time before a possible hazard situation or situation in which the fluid flow of traffic is possibly disrupted;
the existence of a need for communication; and/or
a type and urgency of a request to be transmitted to the road user.

Furthermore, the control unit 101 may be set up to ascertain vehicle information, such as e.g.

an orientation or a direction of movement of the vehicle 100;
a speed of the vehicle 100;
a requisite braking distance for the vehicle 100;
evasion options for the vehicle 100;
a torque of the vehicle 100;
an acceleration of the vehicle 100;
an intention of the vehicle 100;
a path of the vehicle 100;
a status of the driving automation of the vehicle 100;
a reason for the current driving behavior of the vehicle 100;
information about current and scheduled sound outputs from the vehicle 100; and/or
information about a sound pressure level and about a spectrum of ambient noise for the vehicle 100.

The control unit 101 may be set up to take the road-user-dependent information and/or to take the vehicle information as a basis for generating an acoustic output. In particular, this can involve determining one or more parameters regarding a sound that is to be output or regarding a sound change on the basis of the road-user-dependent information and/or on the basis of the vehicle information. Exemplary parameters are: a sound character, an urgency, an output level, a spectral composition (such as e.g. equalizing), possibly a repetition rate, selection of a basic sound from the database 105, etc. The sound defined in this manner can be output as an acoustic output via the acoustic communication devices 102, 106.

In this case, the sound may have a different manifestation to the acoustic output, for example on the basis of:

the traffic situation between vehicle 100 and road user;
the type, the distance, the position, the direction of movement and/or a prediction of the journey route or a prediction of the behavior of the relevant road users;
the position, the direction of movement, the awareness, the intention and/or the scheduled journey route of the (highly) automated vehicle 100;
a prediction of a possible "time to collision" and/or an assessment of the probability and/or of the potential extent of damage of an accident;
a communication strategy of the vehicle 100, which may be de-escalating, respect-demanding, proactive and/or univocal;
the valid traffic regulations and laws and/or the valid noise regulations and laws;
the aims of recognizability and identifiability as a vehicle 100 (driving in "highly" automated fashion) or road user;
the pinpointability of the vehicle 100 as a result of the generated sound, the pinpointability of the source of the sound on the vehicle 100 and/or the desired point of attention on the vehicle 100 (for example vehicle front or rear, depending on the (scheduled) direction of travel); and/or
the ambient noise (tone, volume, spectrum, etc.).

By way of example, the control unit 101 can select one or more basic sounds or algorithms for generating sounds from a database 105. The basic sounds provided in this manner can be modulated if need be on the basis of the aforementioned information in order to alter one or more properties or parameters of a basic sound. Furthermore, the one or more basic sounds can be mixed in order to adjust the volume. In addition, the acoustic output can possibly involve splitting over different acoustic actuators of the acoustic communication devices 102, 106.

Figure 2:
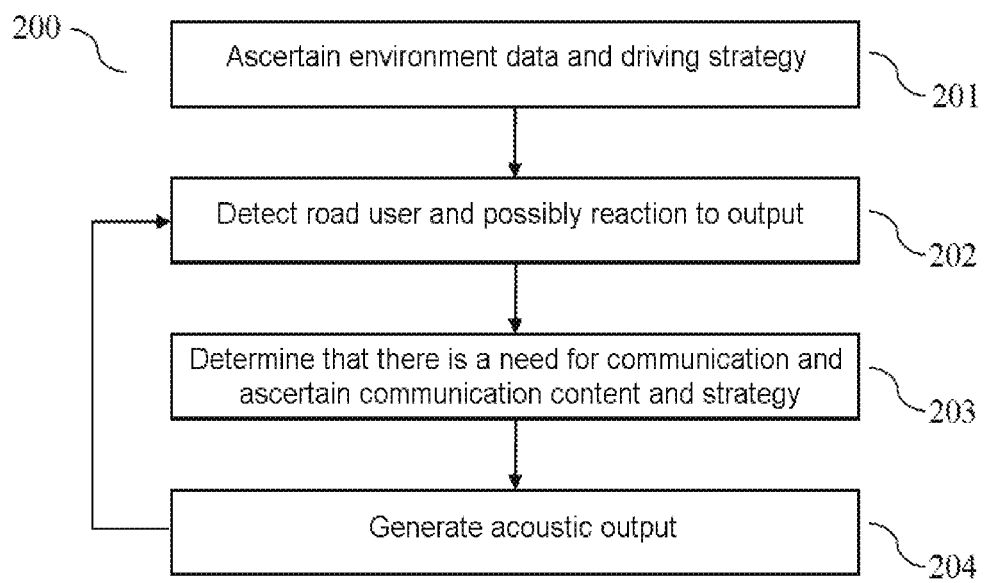
FIG. 2 is a flowchart for an exemplary method for communication between a vehicle and a road user.

FIG. 2 shows a flowchart for an exemplary method 200 for direct communication between a vehicle 100 and a road user. The method 200 includes the ascertainment 201 of environment data on the basis of one or more ambient sensors 103 of the vehicle 100. In particular, a camera can be used to ascertain image data for the surroundings of the vehicle. Furthermore, the method 200 includes the detection 202, on the basis of the environment data, of at least one road user in an environment of the vehicle 100. By way of example, a human road user can be identified in the surroundings of the vehicle. The method 200 additionally includes the determination 203, on the basis of the environment data and possibly the driving strategy, that there is a need for communication between the vehicle 100 and the road user. In particular, it is possible to ascertain that the road user is in the process of ascertaining whether be has been detected by the vehicle 100. By way of example, the environment data can be taken as a basis for identifying that the human road user is looking in the direction of the vehicle 100. Furthermore, it is possible, for example, for a facial expression of a human road user to be taken as a basis for determining whether the human road user is currently in the process of ascertaining whether be has been detected by the vehicle 100. Furthermore, the environment data and possibly the driving strategy of the vehicle can be taken as a basis for ascertaining communication content as a communication strategy for the communication of the communication content. The communication content and strategy can also be ascertained on the basis of the reaction of the road user to communication by the vehicle 100 that has already taken place.

The method 200 additionally includes the generation 204 of an acoustic output via one or more acoustic communication devices 102, 106 of the vehicle 100 when it has been determined that there is a need for communication (e.g. when it has been determined that the road user is in the process of ascertaining whether be has been detected by the vehicle 100). The acoustic output may be dependent on the ascertained communication content and strategy. The acoustic output may be designed to indicate to the road user that be has been detected by the vehicle 100. The effect that can be achieved by the acoustic effect is e.g. that the road user can better assess the future actions of the vehicle 100, since be knows that he has been detected by the vehicle, and the vehicle 100 will therefore take the road user into account for the future actions.

As FIG. 2 shows, steps 202, 203, 204 can be repeated. In particular, it is possible, if need be, to react to a first output by adjusting the communication content and/or the communication strategy for a subsequent second output.

The output of acoustic signals that is described herein for vehicles driving in automated fashion allows replacement of the absent informal communication between driver and other ad users (visual contact, gestures, etc.). This allows fluent interaction with other road users. As a result, the flow of traffic can be improved. Furthermore, comfort is increased for the driver of a vehicle 100, since the advantages of automated driving can be used to the full extent. In particular, the driver can further remove himself from events, since even the interaction with other road users is undertaken independently by the HAD (highly automated driving) vehicle. Furthermore, the measures described can be taken as a basis for increasing the safety of the vehicle 100 by preventing misunderstandings with other road users.

It should be pointed out that the measures described can be used for vehicles without synthetic sound and for vehicles with synthetic sound (including vehicles with quiet car sound and vehicles with synthetic sound expansion).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control unit for a vehicle, wherein the control unit is operatively configured to:
   receive environment data from one or more ambient sensors of the vehicle;
   take the environment data as a basis for detecting at least one road user in an environment of the vehicle;
   take the environment data as a basis for determining whether there is a need for communication between the road user and the vehicle;
   ascertain a position of the road user; and
   if there is a need for communication between the road user and the vehicle, generate a locally pinpointed acoustic output in the direction of the position of the road user by prompting an acoustic group emitter of the vehicle, having a multiplicity of individual emitters, to generate the locally pinpointed acoustic output.

2. The control unit according to claim 1, wherein the control unit is further operatively configured to ascertain what content needs to be communicated from the vehicle to the road user and/or how the content needs to be communicated from the vehicle to the road user; wherein
   the acoustic output is generated on the basis of the content to be communicated and/or on the basis of how the content is to be communicated.

3. The control unit according to claim 1, wherein:
   the control unit is further operatively configured to ascertain vehicle data in relation to a driving strategy of the vehicle, in relation to a driving destination of the vehicle, in relation to a driving mode of the vehicle, in relation to an action by an occupant of the vehicle and/or in relation to a preference of an occupant of the vehicle; and
   the vehicle data are also taken as a basis for determining whether there is a need for communication between the road user and the vehicle, and if need be what content needs to be communicated in what way.

4. The control unit according to claim 1, wherein the control unit is further operatively configured to take the need for communication as a basis for one or more of:
   selecting a sound for the acoustic output from a multiplicity of predefined sounds;
   generating a sound for the acoustic output by way of a sound algorithm from a multiplicity of predefined sound algorithms; or
   modulating a sound generated synthetically or nonsynthetically by the vehicle and/or a sound generated for the acoustic output.

5. The control unit according to claim 1, wherein the control unit is further operatively configured to:
   ascertain ambient noise in the environment of the vehicle; and
   generate the acoustic output on the basis of the ambient noise.

6. The control unit according to claim 1, wherein:
   the acoustic output comprises a combination of transient and nontransient sound events;
   the nontransient sound events are abstract and nonabstract; and
   the transient sound events comprise human voice and/or a combination of abstract and/or nonabstract sound elements that act as nonhuman voice.

7. The control unit according to claim 1, wherein the control unit is further operatively configured to:
   take the environment data as a basis for determining that there is a need for communication between the vehicle and a multiplicity of road users; and
   prompt the one or more acoustic communication devices of the vehicle to generate a multiplicity of acoustic outputs for a communication with the corresponding multiplicity of road users.

8. A control unit for a vehicle, wherein the control unit is operatively configured to:
   receive environment data from one or more ambient sensors of the vehicle;
   take the environment data as a basis for detecting at least one road user in an environment of the vehicle;
   take the environment data as a basis for determining whether there is a need for communication between the road user and the vehicle;
   if there is a need for communication between the road user and the vehicle, prompt one or more acoustic communication devices of the vehicle to generate an acoustic output in order to communicate with the road user;
   ascertain one or more properties in relation to the need for communication between the road user and the vehicle; and
   generate the acoustic output on the basis of the one or more properties in relation to the need for communication.

9. The control unit according to claim 8, wherein the control unit is further operatively configured to:

ascertain a position of the road user; and generate a locally pinpointed acoustic output in the direction of the position of the road user.

10. The control unit according to claim 9, wherein:

the one or more acoustic communication devices comprise an acoustic group emitter having a multiplicity of individual emitters; and the control unit is further operatively configured to prompt the acoustic group emitter to generate the locally pinpointed acoustic output.

11. The control unit according to claim 8, wherein the one or more properties in relation to the need for communication comprise one or more of:

urgency of a communication between the road user and the vehicle;

content of the communication between the road user and the vehicle; or intention of the communication between the road user and the vehicle.

12. A method for communication between a vehicle and a road user, wherein the method comprises the acts of:

ascertaining environment data on the basis of one or more ambient sensors of the vehicle;

detecting, on the basis of the environment data, at least one road user in an environment of the vehicle;

determining, on the basis of the environment data and on the basis of a driving strategy of the vehicle, whether there is a need for communication between the road user and the vehicle and what content needs to be communicated with what communication strategy;

if there is a need for communication between the road user and the vehicle, generating an acoustic output on the basis of the content and the communication strategy by way of one or more acoustic communication devices of the vehicle in order to communicate with the road user;

taking the environment data as a basis for determining that there is a need for communication between the vehicle and a multiplicity of road users; and prompting the one or more acoustic communication devices of the vehicle to generate a multiplicity of acoustic outputs for a communication with the corresponding multiplicity of road users.

\* \* \* \* \*